Dec. 18, 1956  D. A. LACE  2,774,893
IMPULSE MOTOR
Filed Feb. 26, 1953
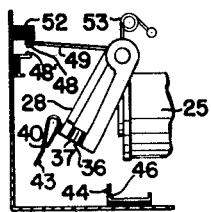
FIG. 9
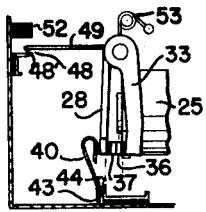
FIG. 6
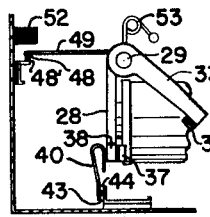
FIG. 8
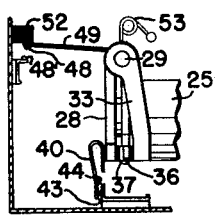
FIG. 7
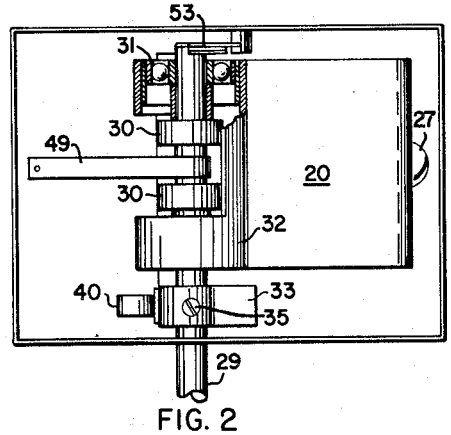
FIG. 2
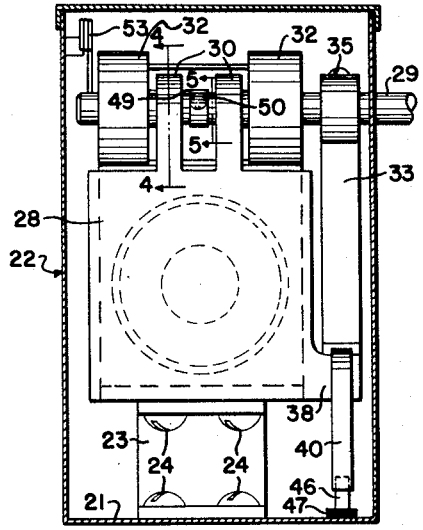
FIG. 3
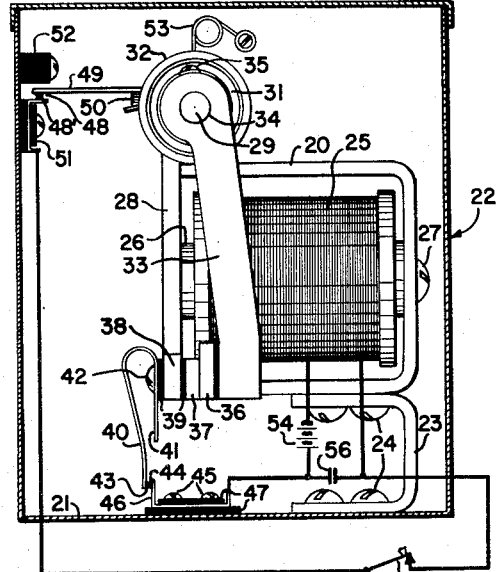
FIG. 1
FIG. 12
FIG. 10
FIG. 4
FIG. 5
FIG. 13
FIG. 11
*INVENTOR.*
DONALD A. LACE
BY
ATTORNEY

United States Patent Office 2,774,893
Patented Dec. 18, 1956

2,774,893
IMPULSE MOTOR

Donald A. Lace, Chicago, Ill., assignor to Time-O-Matic Company, Danville, Ill.

Application February 26, 1953, Serial No. 339,031

16 Claims. (Cl. 310—32)

This invention relates in general to impulse type motors and more particularly to electromagnetically operated impulse motors particularly well adapted to develop substantial torque from a small battery current supply.

The principal object of this invention is the provision of an impulse motor capable of producing substantial torque with a minimum current drawn.

Another object of the invention resides in its adaptability to continuous operation over protracted periods from a single small battery current supply.

Still another object of this invention resides in its simplicity of construction and economical cost of manufacture while yet being rugged and dependable in operation.

A feature of this invention resides in the provision of novel break thru and/or directional bypassing contact arrangements for the electro-magnet operating circuit of the instant motor.

These and numerous additional features and advantages will become more readily apparent as the following description proceeds, taken in conjunction with the accompanying drawings wherein:

Fig. 1 is a side elevation with the casing in section and circuit in schematic.

Fig. 2 is a top plan view of Fig. 1.

Fig. 3 is a front elevation of Fig. 1.

Figs. 4 and 5 are sections taken on lines 4—4 and 5—5 respectively of Fig. 3.

Figs. 6–9 are partial schematic views similar to Fig. 1 showing the device of Fig. 1 in various positions during one complete cycle of operation.

Fig. 10 is a partial schematic view similar to Fig. 1, but showing a different embodiment of a contact arrangement for the magnet operating circuit.

Fig. 11 is a section taken on line 11—11 of Fig. 10 with the path of the movable contact member thru one complete cycle of operation traced in phantom lines.

Fig. 12 is a partial schematic view similar to Fig. 10 showing a still different embodiment of contact arrangement for the magnet operating circuit.

Fig. 13 is a section taken on line 13—13 of Fig. 12 with the path of the movable contact member thru one complete cycle of operation traced in phantom lines.

Referring now in detail to the drawings, the impulse motor of this invention comprises a magnetic frame member 20 preferably of flat cold rolled plate steel and bent or formed into the general shape of a U. The frame 20 as illustrated is mounted to the base 21 of a housing or case 22 by means of a bracket 23 and small screws 24 received in suitably tapped holes in the housing base 21 and frame 20. Within the magnetic frame 20 there is mounted a coil 25 suitably wound about a central core 26 in well known manner and mounted to the frame by means such as a screw 27 also in well known manner.

The magnetic circuit including core 26 and frame 20 is completed thru an armature 28 pivotally journalled to a shaft 29 by means of straps or ears bent to closely conform to the curvature of the shaft 29.

The shaft 29 is journalled in a pair of bearings 31, preferably of the substantially frictionless ball bearing type, the races of which are in turn mounted as by a press fit in a somewhat tubular bearing mount 32 secured by any suitable means, such as brazing to the top of magnetic frame 20 and cut away centrally to permit free movement of armature straps 30 therewithin. The manner in which the bearing mount 32 is centrally cut away to receive the armature ears or hinge like straps 30 conforming to the curvature of shaft 29, is best seen in detail in Fig. 2 and the sectional view of Fig. 4.

Adjacent the armature end of magnetic coil 25 and frame 20 and to one side thereof, a torque arm 33 is mounted on the shaft 29 which extends through a complementary bore 34 in one end of the torque arm and is affixed thereto by means such as a set screw 35. At the other end of the torque arm 33 there is an electrical contact 36 of substantial area electrically and mechanically connected thereto. The contact 36 is arranged on the forward face of the torque arm 33 in a manner so that it mates with a corresponding contact 37 affixed to a projecting portion 38 of armature 28. The contact 37 is however, electrically insulated from armature 28 by one of a pair of insulating pieces 39. On the opposite side of the projection 38 from contact 37 there is secured a curved resilient spring like contact member 40 and a suitable stop member 41 therefor but also insulated from the armature 28 by the other of the insulator pieces 39. A screw 42 extends through one end of resilient contact member 40, the stop member 41, one insulator piece 39, an enlarged bore in projection 38 of armature 28 so that it does not come into contact therewith, the second insulator piece 39, and into a tapped bore in the non-contacting side of the contact 37.

The resilient contact member 40 is preferably made of thin strip copper or a conducting alloy and is tensioned at rest against its stop member 41 which may comprise a strip of sheet steel. At the other end of contact member 40, there is provided a contact 43. Adjustably secured to the base 21 of case 20 but electrically insulated therefrom, there is a mating stationary contact 44 for contact 43. Normally, the position of contact 44 is such that when the armature 28 is drawn up against core 26 and the ends of frame 20 in closed magnetic circuit, contacts 43 and 44 are closed with the resilient contact member 40 however, depressed away or spaced from its stop member 41 by a small margin, such as 3/32". Moreover, the device is arranged so that contacts 43 and 44 first make contact at the position where torque arm 33 hangs freely in substantially its gravitational or rest position. Contacts 36, 37 are also closed in this position (Fig. 6) and the armature 28 is spaced at a slight angle α from the end of core 26. This angle is between 1° and 5°, preferably 2°, and will be hereinafter referred to as the thrust angle and is shown particularly in Fig. 6. The thrust angle may be varied through restricted limits by changing the position of contact 44 by means of screws 45 in slots (not shown) in the carrier 46 and insulator members 47 of stationary contact 44. As stated before, the free hanging or rest position of the torque arm 33 will be substantially at the maximum position of thrust angle adjustability.

A third direction responsive control contact pair 48, 48' is operable upon change of direction of the torque arm 33 and shaft 29. The upper or movable contact 48 of this contact pair is positioned adjacent one end of a contact arm 49 which at its other end is curved around shaft 29 and held in light frictional engagement therewith by means of a spring 50 (see particularly Fig. 5). Movement of arm 49 is limited between mating contact 48' on a bracket 51 attached to a wall of housing 22 but insulated therefrom, and a stop or buffer member also secured to the wall of the housing. The spring 50 provides sufficient tension so that arm 49 can move freely between its limits, contact 49 and stop 52, with movement of torque arm 33 and shaft 29, but as soon as the contact arm 49 reaches either of its limits, it remains there, its curved portion slipping relative to the shaft 29. In this manner, a simple friction clutch of small magnitude is provided which is self adjustable due to the bias of the spring 50. The arm 49 may be of any suitable electrical conducting material such as strip brass and all of the small contacts such as 48, 48' and 43, 44 may be of German silver or platinum or other suitable contact material. The large contacts 36 and 37 are preferably of copper.

A particularly smooth and snappy operating action is obtained by the employment of a coil spring 53 which is connected between the shaft 29 and the housing 22. As illustrated, this spring may be secured to the end of the shaft 29 terminating within the casing 22. The spring 53 is preferably zeroed or arranged so that it exerts no pressure or bias when the torque arm 33 hangs about half way between the trust angle as previously described. It is to be understood that this spring 53 is by no means essential to successful operation of the motor of this invention but merely enhances and speeds its impulse operation.

The opposite end of shaft 29 which projects from the casing 22 is the working shaft and can be connected to any device to which it is desired to impart a waving or wagging motion and for this reason the device is also particularly well adapted to advertising devices wherein movement of, for example, an arm is desired, or to a wig-wag railroad warning signal or the like. As the operation of the device is smooth and rhythmic it can also be used as a timing device. The device is furthermore so proportioned as to be particularly adapted to economical battery operation although other current sources are not precluded.

An operating circuit for the impulse motor of this invention is shown schematically in Fig. 1 and is traced as follows: from battery 54 through contacts 43, 44, resilient contact member 40, contacts 36, 37, torque arm 33, shaft 29, contact arm 49, contacts 48, 48', switch 55, coil 25 and back to battery. A condenser 56 is provided between the leads from magnet coil 25 for spark suppression at the various contacts in the circuit.

As illustrated in Fig. 1, the armature is in its fully attracted position, or at the end of its thrust stroke. The circuit traced is equally applicable to Fig. 6 or the beginning of the armature thrust stroke, and the closure of the circuit traced may be assumed to have occurred in the sequence position illustrated in Fig. 6. The coil energizes snapping the armature through the thrust angle and into closed magnetic circuit as seen in Fig. 1 or Fig. 7. The force of armature 28 is transmitted through projection 38 and contact 37 to contact 36 and torque arm 33. The torque arm 33 moves (Fig. 8) in a counterclockwise arc until its momentum is overcome by inertia and/or tension of spring 53 if utilized, whereupon the torque arm begins a return or clockwise pendulum like swing. Substantially simultaneous with the beginning of this return movement, direction responsive contacts 48, 48' open so that even though contacts 36, 37 close as the torque arm 33 meets armature 28 (Fig. 7), the circuit remains open. The momentum of the torque arm 33 carries the armature 28 in a clockwise arc with it (Fig. 6, Fig. 9) until now, combined inertia of armature 28 and torque arm 33, and/or bias of spring 43 overcomes the momentum of torque arm 33 arresting its clockwise swing. Together, the pair of relatively movable members comprising armature 28 and torque arm 33, with contacts 36, 37 closed begin a simultaneous counterclockwise swing. Direction responsive contacts 48, 48' close substantially simultaneously therewith but the operating circuit is not again completed until contact 43 closes with contact 44, that is, at the outer extreme of the thrust angle or cycle. The coil 25 then energizes and the complete cycle is repeated. It will be readily recognized therefore, that the thrust angle and closed circuit time is extremely small relative to the total cycle travel and time. Consequently the current consumed is surprisingly little notwithstanding that a substantial torque is developed and applicable from the outer or working end of shaft 29.

An alternate form of an angular return bypassing break through contact is shown in Figs. 10 and 11, which eliminates the necessity of the direction responsive control contacts 48, 48' and related slip clutch arm 49, 50. In this embodiment a resilient contact blade 57 is fixed to the torque arm 33 and suspended therebelow, but insulated therefrom as is contact 36'. However, contact 36' and blade 57 are electrically connected. In this embodiment contact 37' is both electrically and mechanically connected to armature 28. A second stationary contact blade 58 is fixed to but insulated from the housing base 21 in angular relation toward the motor and in the path of torque arm 33 and its depending blade 57. The side of blade 58 away from the motor is insulated as at 59. As described before, the thrust angle is determined by the position of blade 58 which like 46, may be adjustable and its length. As blade 57 touches the leading edge of angular blade 58 the circuit is closed from battery through blades 58, 57, contacts 36', 37', armature 28, shaft 29, coil 25 and back to battery. The armature operating through the thrust angle drives the torque arm 33 into its powered counterclockwise movement breaking the circuit at contacts 36', 37'. As torque arm 33 returns clockwise however, its depending blade 57 is deflected along the insulated side of the angularly positioned blade 58 so that the circuit remains open notwithstanding contacts 36', 37' again closing as the torque arm 33 meets the armature 28. The return movement continues to the position in Fig. 9 and then counterclockwise again until the circuit is closed when blades 57 and 58 contact. The thrust period and angle are here determined by the length of deflector blade 58 and again the closed circuit time is but a small fraction of the entire operating sequence time notwithstanding the development of the same substantial torque.

Still another arrangement of an angular return by-passing break through contact such as has just been described is illustrated schematically in Figs. 12 and 13. In this arrangement a similar resilient blade like contact 57' is both mechanically and electrically connected to the armature 28. A stationary contact blade 58' is provided similar to that of the device in Figs. 10 and 11, angularly positioned toward the motor in the path of movement of the armature 28 and its depending contact blade 57', and provided with insulation 59' on the side away from the motor. The stationary blade 58' is in length again corresponding to the desired thrust angle but in this instance, terminates just short of the trailing edge of blade 57' when the armature is in fully attracted position.

In this device the necessity for both direction responsive contacts such as 48, 48' and the break through contacts 36, 37 between the armature 28 and torque arm 33 is eliminated and contacts 36, 37 are merely mechanical buffers and may consist of any suitable material, metallic or non metallic.

The operation is similar to that described regarding the device of Figs. 10 and 11. Blade 57' makes contact with stationary blade 58' at the beginning of the thrust angle or cycle closing a simple circuit from battery therethrough, through armature 28, shaft 29 and back to battery. As the armature 28 is attracted it propels torque arm 33 in its counterclockwise swing. As the thrust angle of armature 28 is completed, that is in fully attracted position, blade 57' springs to normal position behind blade 58' and when the torque arm 33 returns and meets armature 28 carrying it in its clockwise arc, blade 57' is propelled across the insulated side 59' of blade 58' so that the circuit remains open.

It will be understood that in either of the arrangements just described, springs such as 53 may be employed and that in all respects, the mechanical structure of the motor is the same as described with regard to the principal embodiment of Figs. 1-9.

In any of the arrangements described, it will be apparent that U shaped cores 26 for the operating magnet 25 with coils on both legs can as well be employed to obtain greater ampere turns and greater operating efficiency. Likewise, although only single action devices and circuit arrangements have been described, and particularly with respect to the blade type of contact arrangement, a double action motor can likewise be achieved wherein alternate push-pull powered strokes of the pendulum like movement of torque arm 33 can be accomplished from oppositely disposed magnets and armatures operating in sequence one one torque arm.

It will be further apparent that these and additional modifications will suggest themselves to those skilled in the art and it is here intended to include all such modifications coming within the spirit of this invention in the scope thereof as best defined in the appended claims.

I claim:

1. In an impulse motor, an electromagnet, movable members comprising an armature for said magnet and a torque arm mounted for relative rotation, said torque arm being mounted in the path of movement of at least a portion of said armature, and circuit means including one of said members and a pair of contacts, one being stationary and the other attached to one of said members for intermittently energizing said magnet to drive said torque arm.

2. In an impulse motor, an electromagnet, movable members comprising an armature for said magnet and a torque arm mounted for relative rotation, said torque arm being mounted in the path of movement of at least a portion of said armature, and circuit means including a pair of contacts, one being stationary and the other attached to one of said members for intermittently energizing said magnet to drive said torque arm, said stationary contact being adjustable to vary the thrust angle of said armature.

3. In an impulse motor, an electromagnet, movable members comprising an armature for said magnet and a torque arm mounted for relative rotation on a common shaft, said torque arm being mounted in the path of movement of at least a portion of said armature, and circuit means including one of said members and a pair of contacts, one being stationary and the other attached to one of said members for intermittently energizing said magnet to drive said torque arm.

4. In an impulse motor, an electromagnet, movable members comprising an armature for said magnet and a torque arm mounted for relative rotation, said torque arm being mounted in the path of movement of at least a portion of said armature; circuit means including connected in series a pair of contacts, one being stationary and the other attached to one of said members, and a second pair of contacts between said armature and torque arm for intermittently energizing said magnet to drive said torque arm.

5. In an impulse motor, an electromagnet, movable members comprising an armature for said magnet and a torque arm mounted for relative rotation, said torque arm being mounted in the path of movement of at least a portion of said armature; circuit means including connected in series a pair of contacts, one being stationary and the other attached to one of said members, a second pair of contacts between said armature and torque arm, and a third pair of contacts, one of which is stationary and the other being movable responsive to the direction of rotation of said torque arm for intermittently energizing said magnet to drive said torque arm.

6. In an impulse motor, an electromagnet, movable members comprising an armature for said magnet and a torque arm mounted for relative rotation on a common shaft, said torque being mounted in the path of movement of at least a portion of said armature; and circuit means including connected in series a pair of contacts, one being stationary and the other having a resilient member attached to one of said members, a second pair of contacts between said armature and torque arm, and a third pair of contacts, one of which is stationary and the other being movable responsive to the direction of rotation of said torque arm for intermittently energizing said magnet to drive said torque arm, the stationary contact of said first mentioned pair of contacts being adjustable to vary the thrust angle of said armature.

7. A contact arrangement for intermittently energizing an electromagnet, the armature of which is adapted to drive a body mounted for rotation relative to said armature, comprising a stationary contact and a movable contact therefor having a resilient arm connected to one of said armature and said body, and a second pair of contacts between said armature and said body, said contacts being connected in series.

8. Contact arrangement as claimed in claim 7 wherein said resilient arm is connected to said body and said stationary contact therefor is angularly disposed relative to the free moving path of said resilient arm whereby said movable contact bypasses its fixed contact when moving in one direction.

9. Contact arrangement as claimed in claim 7, including a third pair of contacts, one of which is movable responsive to change of direction of said body, said third pair of contacts also being connected in series with said other pairs of contacts.

10. In an impulse motor, an electromagnet, a shaft, an armature and a torque arm mounted on said shaft for rotation relative to each other, said torque arm being positioned in the path of movement of at least a portion of said armature, and circuit means for momentarily energizing said magnet to attract said armature through a small thrust angle to propel said torque arm to one extreme position of stored potential energy, said circuit means including two pairs of contacts connected in series, one pair being open when the other pair is closed and vice versa except for a momentary overlapping period when both pairs are closed to energize said magnet.

11. In an impulse motor, an electromagnet, a shaft, an armature and a torque arm mounted on said shaft for rotation relative to each other, said torque arm being positioned in the path of movement of at least a portion of said armature, and circuit means for momentarily energizing said magnet to attract said armature through a small thrust angle to propel said torque arm to one extreme position of stored potential energy, said circuit means including a pair of contacts between said armature and torque arm and a second relatively yieldable pair of contacts connected in series with said other pair of contacts for completing said circuit means at the beginning of said thrust angle.

12. An impulse motor as claimed in claim 11, in which said thrust angle is adjustable between preselected limits whereby the resultant amount of torque may be regulated.

13. In an impulse motor, an electromagnet, a shaft, an armature and a torque arm mounted on said shaft for rotation relative ot each other, said torque arm being positioned in the path of movement of at least a portion of said armature, and circuit means for momentarily energizing said magnet to attract said armature through a small thrust angle to propel said torque arm to one extreme position of stored potential energy, said circuit means including a pair of contacts between said armature and torque arm closed during the momentary period said armature is being attracted to said magnet, and a spring contact for closing said circuit means at the beginning of said thrust angle, said torque arm returning in an arc like pendulum movement carrying said armature therewith to the other extreme position of stored potential energy, and direction responsive means for maintaining said circuit open at least during the thrust angle portion of said arcuate movement.

14. An impulse motor as claimed in claim 13, wherein said direction responsive means comprises an arm in friction clutch engagement with said shaft operable between limits to open and close a pair of contacts in said circuit means when the angular direction of said shaft changes.

15. In an impulse motor, a pair of independently movable contact bearing members mounted on a common axis, means for moving said members as a unit a limited distance in opposite directions while said contacts are closed, means actuated by the unit movement in one direction only for effecting the independent continued movement of one of the members in both directions during which said contacts are open, and additional contact means for completing a circuit thru said first mentioned contacts when said members are moving as a unit in said one direction only.

16. In an impulse motor, a pair of independently movable contact bearing members mounted on a common axis, means for moving said members as a unit a limited distance in opposite directions while said contacts are closed, means actuated by the unit movement in one direction only for effecting the independent continued movement of one of the members in both directions during which said contacts are open, and additional contact means for completing a circuit thru said first mentioned contacts during the time a small angular distance is traversed by said members moving as a unit in said one direction only.

References Cited in the file of this patent
UNITED STATES PATENTS

| 1,967,451 | Rich | July 24, 1934 |
| 2,129,882 | Shattuck | Sept. 13, 1938 |
| 2,514,836 | Buntzman | July 11, 1950 |
| 2,610,995 | Orsatti | Sept. 16, 1952 |
| 2,617,950 | Lace | Nov. 11, 1952 |

FOREIGN PATENTS

| 35,885 | Austria | Jan. 25, 1909 |
| 76,258 | Switzerland | Nov. 16, 1917 |
| 294,729 | Germany | Apr. 2, 1917 |